(12) United States Patent
Isert

(10) Patent No.: US 8,886,456 B2
(45) Date of Patent: Nov. 11, 2014

(54) MOTOR VEHICLE HAVING A NAVIGATION SYSTEM

(75) Inventor: Carsten Isert, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 549 days.

(21) Appl. No.: 13/155,169

(22) Filed: Jun. 7, 2011

(65) Prior Publication Data

US 2011/0301838 A1    Dec. 8, 2011

(30) Foreign Application Priority Data

Jun. 8, 2010   (DE) .......................... 10 2010 029 822

(51) Int. Cl.
*G01C 21/36*    (2006.01)

(52) U.S. Cl.
CPC ........ *G01C 21/3658* (2013.01); *G01C 21/3647* (2013.01)
USPC ............................ 701/439; 701/428; 701/429

(58) Field of Classification Search
USPC ........................................................ 701/201
See application file for complete search history.

(56) References Cited

U.S. PATENT DOCUMENTS

| | | | |
|---|---|---|---|
| 6,446,000 B2 | 9/2002 | Shimabara | |
| 6,700,505 B2 | 3/2004 | Yamashita et al. | |
| 2003/0033080 A1* | 2/2003 | Monde et al. ................. | 701/201 |
| 2007/0106460 A1 | 5/2007 | Nakayama et al. | |
| 2009/0177388 A1* | 7/2009 | Schmidt ....................... | 701/209 |

FOREIGN PATENT DOCUMENTS

| | | | |
|---|---|---|---|
| DE | 10 2008 003 395 A1 | 7/2009 | |
| DE | 10 2008 062 206 A1 | 9/2009 | |
| DE | 10 2009 012 225 A1 | 9/2010 | |
| EP | 1 548 404 A1 | 6/2005 | |
| JP | 08210867 A * | 8/1996 | ............. G01C 21/00 |
| WO | WO 2004/111574 A1 | 12/2004 | |
| WO | WO 2005/090918 A1 | 9/2005 | |

OTHER PUBLICATIONS

German Search Report dated Jan. 18, 2011 with partial English translation (nine (9) pages).

* cited by examiner

*Primary Examiner* — Shelley Chen
(74) *Attorney, Agent, or Firm* — Crowell & Moring LLP

(57) ABSTRACT

A motor vehicle has a navigation system, which includes a graphic display unit and by which accurate-lane destination guidance is made possible on a planned route. A road map containing lane information can be displayed on the display unit. Within or in superimposition of the displayed road map, the route can be displayed accurately with respect to the lanes. A lane guidance display area can be displayed, which is graphically set off from the road map and within which several lanes of a currently traveled route section are graphically represented and within which the necessity of a lane change is graphically displayed. A rating can be determined for the urgency of the lane change, and this rating can be graphically displayed in the lane guidance display area.

18 Claims, 2 Drawing Sheets

MOTOR VEHICLE HAVING A NAVIGATION SYSTEM

CROSS-REFERENCE TO RELATED APPLICATION

This application claims priority under 35 U.S.C. §119 from German Patent Application No. DE 10 2010 029 822.0, filed Jun. 8, 2010, the entire disclosure of which is herein expressly incorporated by reference.

BACKGROUND AND SUMMARY OF THE INVENTION

The invention relates to a motor vehicle having a navigation system, which includes a graphic display unit, and by which accurate-lane destination guidance is made possible on a planned route.

Motor vehicles having such navigation systems have been treated in different fashions in the prior art. US 2007/0106460, for example, relates to principles of accurate-lane navigation, among other aspects. WO 2005/090918 A1 relates to improving the precision of driving instructions or to a camera-based lane detection. From U.S. Pat. No. 6,700,505 B2, a navigation system is known that has lane guidance for individual intersections by means of arrows and partly multiple routes. In particular, the defining or indicating of a lane is treated there on which an intersection is to be exited. In this case, several intersections may also be combined. WO 2004/111574 A1 describes a navigation system with the following capabilities: lane detection, output of lane changes in the case of a large number of lanes, connection with object detection for suppressing lane change instructions, and combined visual and acoustic instructions. EP 1 548 404 A1 relates to principles of accurate-lane route planning.

Current navigation systems available on the market partly also already comprise so-called lane assistants. Functionalities, such as "Junction View" and/or "Motorway Junction Objects" additionally assist the driver in finding routes and interpreting maps.

It is an object of the invention to create a motor vehicle having a navigation system which assists the driver in a further improved fashion.

This and other objects are achieved by a motor vehicle having a navigation system, which includes a graphic display unit, and by which an accurate-lane destination guidance is made possible on a planned route. A road map containing lane information is displayable on the display unit. Within or in superimposition of the displayed road map, the route is displayable accurately with respect to the lanes. In addition, a lane guidance display area is displayable, which is graphically set off from the road map and within which several lanes of a currently traveled route section are graphically represented and within which the necessity of a lane change is graphically displayed. A rating is determinable for the urgency of the lane change. This rating is graphically displayable in the lane guidance display area.

The invention permits a driver of the motor vehicle to visualize particularly the urgency of a lane change in a simple manner by which the diversion possibilities are reduced. In the case of the invention, the remaining display areas of an accurate-lane navigation can also be displayed to the driver in a simple and low-diversion manner because the visualization of the urgency of the lane change is relocated deliberately and in a targeted fashion into a graphically set-off display area.

In comparison to the above, the systems and processes known from the prior art still have various disadvantages. On the one hand, a precise-lane navigation is as a rule offered only for certain areas (such as intersections), and the transition between areas with an accurate-lane navigation and areas in which this information is not available is not dealt with, or a hard and therefore disturbing and distracting transition takes place between these areas. On the other hand, the driver is as a rule not provided with any overview or preview of lane change maneuvers to be expected in the future. Especially in the case of complex intersection guidance where several lane changes or turn-off maneuvers have to be carried out successively, the known systems and processes do not offer sufficient assistance. Finally, as a rule, the display is also not processed or designed in a targeted manner such that the driver is able to detect the urgency of an imminent lane change.

According to the invention, a lane guidance display area graphically set off from the road map is displayed on the display unit of a navigation system on which also and mainly a road map can be displayed. The road map display contains lane information and within which (or in superimposition on which) a planned route can be displayed accurately with respect to the lanes.

The graphic setting-off can take place, for example, by use of a border. However, the lane guidance display area is preferably situated within the display area of the road map, covering this display area, as it were, in part. In order not to cover essential information, the lane guidance display area is preferably situated at the margin of the display area of the road map.

Within this lane guidance display area—in the following, also called "guidance element", several, preferably all lanes, that can be traveled in the current driving direction of a currently traveled route section are graphically represented, for example, by way of an essentially rectangular top view on a short part of the route section. Such a top view can, but must not be further developed photo-realistically. In the lane guidance display area, it is preferably indicated which of the several lanes are currently being traveled in (actual lane), for example, by overlaying a vehicle symbol in the representation of this lane in the lane guidance display area. It is preferably also indicated in the lane guidance display area which of the several lanes should ideally currently be traveled in (according to the accurate-lane destination guidance) (desired lane or optimal lane). This can be done, for example, by coloring the representation of this lane in the lane guidance display area. If the actual lane and the desired lane deviate from one another, the necessity of a lane change is graphically displayed to the viewer by the discrepancy in the display (for example, the vehicle symbol is not in the colored lane).

In addition, according to the invention, a rating can be determined for the urgency of the lane change and can be graphically displayed in the lane guidance display area. In the simplest case, here the preferred case, the rating of the urgency can consist of several discrete steps (particularly two steps, but also advantageously three steps). The rating of the urgency may, for example, depend on the distance between the current position and a forward turn-off point. The vehicle speed can also be taken into account.

According to a preferred embodiment of the invention, the rating of the urgency can be displayed by a colored design of at least one graphic element of the lane guidance display area. For example, an increased urgency can be visualized by changing the color design of the above-mentioned coloring and/or of the above-mentioned vehicle symbol.

According to an embodiment of the invention, which can be used as an alternative or in addition, lane information, an accurate-lane route (in contrast to an inaccurate-lane route)

and/or the lane guidance display area are displayed only when a certain map scale is set or when there is a falling below a certain threshold of the map scale.

According to an embodiment of the invention, which can be used as an alternative or in addition, several lanes are marked as being optimal in the lane guidance display area, if necessary, particularly when the accurate-lane route computation computes only slight differences with respect to the corresponding lanes.

Other objects, advantages and novel features of the present invention will become apparent from the following detailed description of one or more preferred embodiments when considered in conjunction with the accompanying drawings.

DETAILED DESCRIPTION OF THE DRAWINGS

A motor vehicle equipped with a navigation system includes a graphic display unit. By use of the navigation system, accurate-lane destination guidance is made possible on a planned route for a driver of the motor vehicle. The graphic display unit is constructed as a central display (also called CID, central information display) of the motor vehicle.

In the present case, the scale of the map view can be changed in a manner known per se. In this case, the driver—in a manner that is inventive per se—as an additional zoom step of the map view, is provided with the possibility of setting an accurate-lane map view.

The accurate-lane map view is generated from the already existing map attributes, preferably in real-time during the drive, and is not generated beforehand offline. An interconnected view is preferably available. In this case, all current types of map views are supported, i.e., in particular, a view pointing to the north, a view pointing in the direction of travel and a tilted or birds eye view, are available.

A computation of an accurate-lane route takes place in a manner similar to that of processes known from the prior art. However, in a manner that is inventive per se, the accurate-lane computation preferably takes place for the entire route; although, for saving computing time, at the start of the route computation, only a certain range may be computed that is relevant to the start of the drive, and the remainder of the accurate-lane route will then be computed when the vehicle is already on the way.

Figure 1:
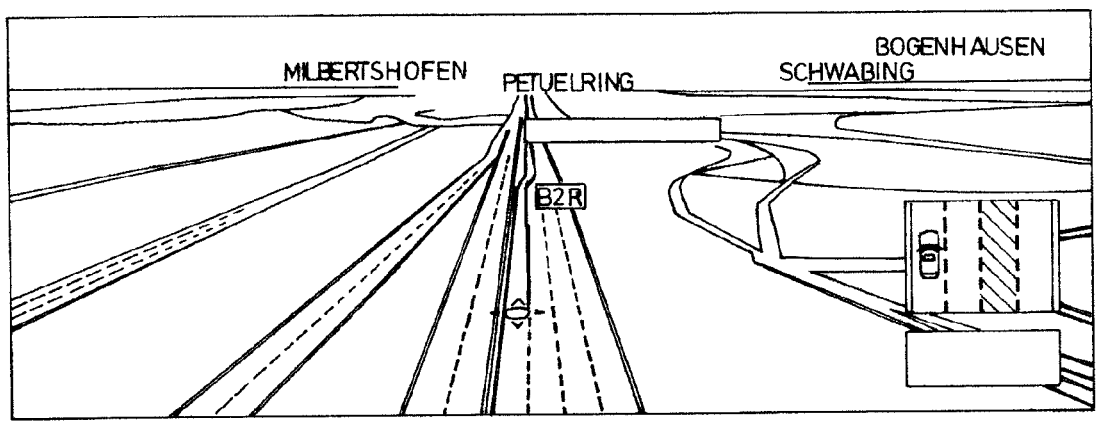
FIG. 1 is an image of the output of a display unit of a navigation system according to an exemplary embodiment of the invention.

The display and the preparation and presentation of lane guidance information for the driver particularly differ from the prior art; compare FIG. 1.

Based on the accurate-lane representation of the road map, an accurate-lane display of the current vehicle position takes place on the map as well as in an additional guidance element (lane guidance display area), which displays only the lanes which are active in the current direction.

In the map view, an accurate-lane route is also displayed which dynamically marks the lane changes to be carried out. In this case, a colored marking takes place which, as a result of the color intensity, indicates how urgently a lane change has to take place. This will particularly be advantageous if—for example, in dense traffic—the selection of the (mathematically) optimal lane is not satisfactory to the driver; for example, because more traffic exists in this lane than in other lanes, or because trucks or other obstacles hinder the drive.

By means of the overview in the road map, the driver can always make a good judgment as to how he should select the lane in the near future in order to reach his destination.

In addition to the graphic display, in a manner known per se, an audio announcement can also point to the necessity of a lane change and/or of a turning-off, etc.

In the view on the side (lane guidance display area) of FIG. 1, it is marked in color for the driver which lane is the lane best suited for his route. The marking can also take place by use of other symbols which already exist in current navigation systems. The own vehicle position is also indicated and can be displayed by suitable symbols. In particular, several lanes may also be indicated as optimal lanes in the lane guiding display area.

The combined display of FIG. 1 should be particularly stressed, which is the result of the combined simultaneous display of the road map area and of the lateral lane guidance display area. It is only by the combination of these two elements that a meaningful display that is plausible to the user takes place, showing which lanes are currently good for him and how he can also drive outside the optimal lane in order to easily reach his destination and in this manner, for example, still pass another vehicle.

The lateral symbols indicated in FIG. 1 can also, for example, be shown in a head-up display or at another suitable location.

The generated accurate-lane view of the intersections can also be converted, for example, to static pictures and can be displayed to the driver at a different location.

Additional elements—already inventive per se—of the solution suggested here relate to the treatment in the event that no optimal lane can be computed because, for example, there is no optimal lane; or, because of a lack of map material, no optimal lane can be determined.

Figure 2A:
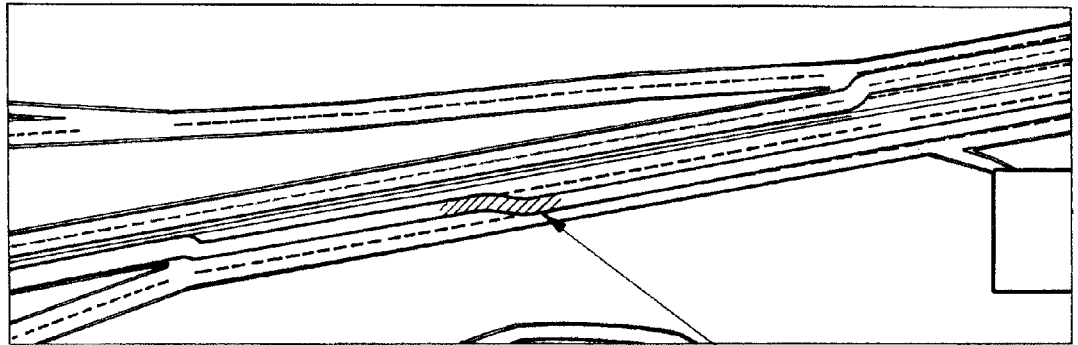
FIG. 2a is a first map view for treating a first case in which no optimal lane can be computed.
Figure 2B:
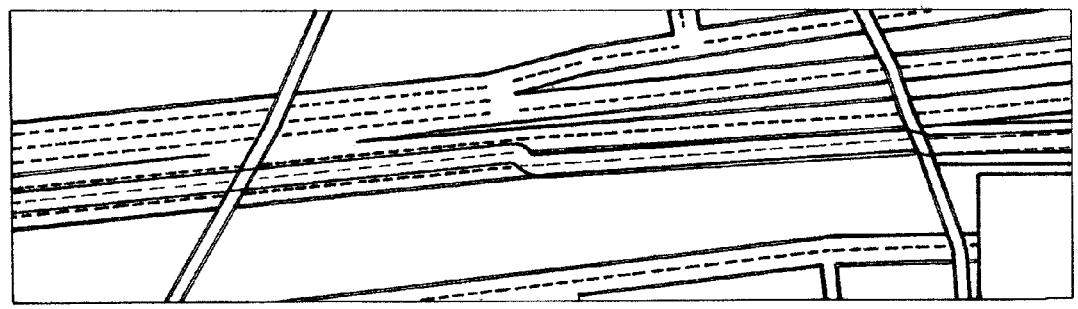
FIG. 2b is a second map view for treating a second case in which no optimal lane can be computed.
Figure 2C:
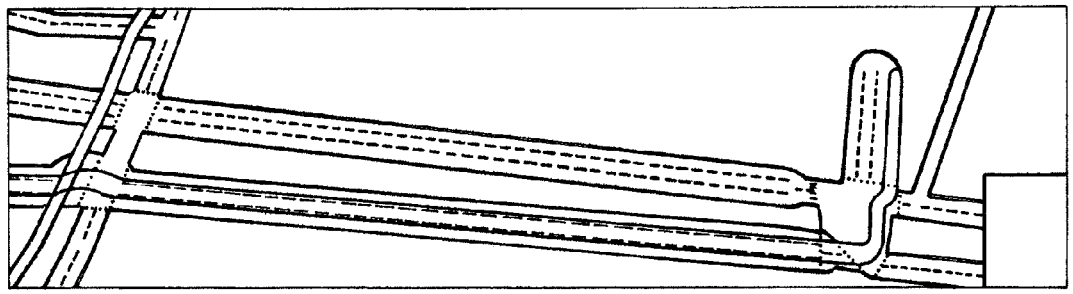
FIG. 2c is a third map view for treating a third case in which no optimal lane can be computed.

In this case, the display is carried out such that the route is displayed to clearly be wider than a single lane, as illustrated in FIGS. 2a, 2b and 2c.

Furthermore, the display of the route takes place to preferably be partially transparent so that the elements situated underneath can be recognized, such as the lane markings.

FIG. 2a shows two different routes. The "top" route in FIG. 2a or the type of display of this route is the result of the fact that no lane information is present. The marked route clearly is therefore shown to be thicker than a single lane and is always placed in the center of the road. In the case of roads with an even number of lanes, it can be recognized that there is no accurate-lane route because the route clearly extends over the center lane marking. In the case of roads with an uneven number of lanes, this can equally be recognized because the route extends over two lane markings.

In the "bottom" route in FIG. 2a, a transition is visible where a change takes place from a route without lane information to a route with lane information. In this case, it can be recognized that the displayed route becomes thinner and then (with lane information) only fills in a single lane. In this case also—possibly marked in color in the display (or in FIG. 2a, with the reference symbol FSW for the lane change)—a lane change can also still be seen. No colored marking is visible at the transition from the not-accurate-lane route to the accurate-lane route. Optionally, a transition can also be marked here.

No lane information is present in the case of the route shown in FIG. 2b. The route is completely recognizable in the accurate-lane view and can nevertheless be of good service to the driver.

A special case is described by means of the route illustrated in FIG. 2c. No lane information is present but since, at the end of the route, only one lane runs in the upward direction, only this lane is marked and the route is shown to be correspondingly narrow.

As a result of the suggested navigation solution, the driver is guided to his destination in an improved manner and his comfort level is raised.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a navigation system, including a graphic display unit, the navigation system providing accurate-lane destination guidance along a planned route;
    wherein:
        a road map depicting lane information is graphically displayed on the graphic display unit;
        an accurate-lane representation of at least a portion of the planned route is graphically displayed one of within and in superimposition on the graphically displayed road map on the graphic display unit;
        a lane guidance display area is displayed on the graphic display unit simultaneously with but graphically distinct from the display of the accurate-lane representation of the at least portion of the planned route, the lane guidance display area being displayed in a graphically set-off manner from the road map, wherein within the lane guidance display area, and distinct from the accurate-lane representation of the at least portion of the planned route, several lanes of a currently traveled section of the planned route are graphically represented and, if required, a necessity of a lane change is graphically displayed; and
        a rating is determinable for an urgency level of a lane change, the rating being graphically displayable in the lane guidance area.

2. The motor vehicle according to claim 1, wherein the rating of the urgency level comprises several discrete steps.

3. The motor vehicle according to claim 1, wherein the rating of the urgency level is displayable by a colored design of at least one graphic element displayed in the lane guidance display area.

4. The motor vehicle according to claim 2, wherein the rating of the urgency level is displayable by a colored design of at least one graphic element displayed in the lane guidance display area.

5. The motor vehicle according to claim 1, wherein at least one of lane information, an accurate-lane route, and the lane guidance display area are displayable only if a defined map scale is set.

6. The motor vehicle according to claim 1, wherein at least one of lane information, an accurate-lane route, and the lane guidance display area are displayable only if a map scale falls below a defined threshold map scale.

7. The motor vehicle according to claim 1, wherein optimal markings of several lanes are provided in the lane guidance display area.

8. A display method for a vehicle navigation system having a graphic display unit which displays accurate-lane destination guidance information along a planned route, the method comprising the acts of:
    displaying a road map depicting lane information on the graphic display unit, the road map including at least a section of the planned route;
    displaying an accurate-lane representation of the at least section of the planned route within or in superimposition on the displayed road map;
    displaying a lane guidance display area simultaneously with but graphically distinct from the displayed accurate-lane representation of the at least section of the planned route, wherein the lane guidance display area is graphically set apart from the displayed road map, wherein several lanes of a currently travelled route section of the planned route are graphically represented and within which any necessary lane change is graphically displayed;
    determining a rating for an urgency level of the necessary lane change; and
    displaying the rating graphically in the lane guidance display area of the graphic display unit.

9. The method according to claim 8, wherein the rating of the urgency level comprises a plurality of discrete rating levels.

10. The method according to claim 8, wherein the displaying of the rating is carried out via a colored design of at least one graphic element displayed in the lane guidance display area of the graphic display unit.

11. The method according to claim 8, wherein at least one of lane information, an accurate-lane route, and the lane guidance display area are displayed only if a defined map scale is set or if the map scale falls below a defined threshold map scale level.

12. The method according to claim 8, further comprising the act of marking several lanes that are optimal in the lane guidance display area.

13. The motor vehicle according to claim 7, wherein a current lane of the motor vehicle from among the several lanes is further provided in the lane guidance display area.

14. The motor vehicle according to claim 1, wherein in the event that optimal lane information is unavailable for at least a portion of the planned route, that portion of the planned route for which optimal lane information is unavailable is displayed to be wider than a single lane on the road map.

15. The motor vehicle according to claim 14, wherein a transition is displayed on the road map between that portion of the planned route for which optimal lane information is unavailable and a portion of the planned route for which optimal lane information is available, and wherein that portion of the planned route for which optimal lane information is available is displayed to fill a single lane and to be thinner than that portion of the planned route for which optimal lane information is unavailable.

16. The method according to claim 12, further comprising indicating a current lane of the motor vehicle from among the several lanes displayed in the lane guidance display area.

17. The method according to claim 1, wherein in the event that optimal lane information is unavailable for at least a portion of the planned route, the method further comprises displaying that portion of the planned route for which optimal lane information is unavailable to be wider than a single lane on the road map.

18. The method according to claim 17, further comprising displaying a transition on the road map between that portion of the planned route for which optimal lane information is unavailable and a portion of the planned route for which optimal lane information is available, and wherein that portion of the planned route for which optimal lane information is available is displayed to fill a single lane and to be thinner than that portion of the planned route for which optimal lane information is unavailable.

\* \* \* \* \*